US011171359B2

(12) United States Patent
Cai et al.

(10) Patent No.: US 11,171,359 B2
(45) Date of Patent: Nov. 9, 2021

(54) SULFUR-BASED COMPOSITE CATHODE-SEPARATOR LAMINATIONS AND BATTERY CELLS COMPRISING THE SAME

(71) Applicant: GM GLOBAL TECHNOLOGY OPERATIONS LLC, Detroit, MI (US)

(72) Inventors: Mei Cai, Bloomfield Hills, MI (US); Fang Dai, Troy, MI (US); Shuru Chen, Troy, MI (US); Biqiong Wang, Madison Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 370 days.

(21) Appl. No.: 16/446,569

(22) Filed: Jun. 19, 2019

(65) Prior Publication Data

US 2020/0403271 A1 Dec. 24, 2020

(51) Int. Cl.
*H01M 10/0565* (2010.01)
*H01M 4/36* (2006.01)
*H01M 10/0525* (2010.01)

(52) U.S. Cl.
CPC ....... *H01M 10/0565* (2013.01); *H01M 4/366* (2013.01); *H01M 10/0525* (2013.01)

(58) Field of Classification Search
None
See application file for complete search history.

(56) References Cited

U.S. PATENT DOCUMENTS

| 2019/0058215 A1 | 2/2019 | Dai et al. |
| 2019/0165415 A1 | 5/2019 | Dai et al. |
| 2019/0165416 A1 | 5/2019 | Dai et al. |
| 2019/0386342 A1* | 12/2019 | He ..................... H01M 4/049 |

* cited by examiner

*Primary Examiner* — Wyatt P McConnell
(74) *Attorney, Agent, or Firm* — Quinn IP Law

(57) ABSTRACT

Composite cathode-separator laminations (CSL) include a current collector with sulfur-based host material applied thereto, a coated separator comprising an electrolyte membrane separator with a carbonaceous coating, and a porous, polymer-based interfacial layer (PBIL) forming a binding interface between the carbonaceous coating and the host material. The host material includes less than about 6% polymeric binder, and less than about 40% electrically conductive carbon, with the balance comprising one or more sulfur compounds. The PBIL can have a thickness of less than about 5 μm and a porosity of about 5% to about 40%. The host material can comprise less than about 40% conductive carbon (e.g., graphene) and have a porosity of less than about 40%. The carbonaceous coating (e.g., graphene) can have a thickness of about 1 μm to about 5 μm. The CSL can be disposed with an anode within an electrolyte to form a lithium-sulfur battery cell.

20 Claims, 2 Drawing Sheets

SULFUR-BASED COMPOSITE CATHODE-SEPARATOR LAMINATIONS AND BATTERY CELLS COMPRISING THE SAME

BACKGROUND

Lithium-sulfur batteries describe a class of rechargeable batteries in which lithium ions move between a negative electrode (i.e., anode) and a positive electrode (i.e., cathode). Liquid, solid, and polymer electrolytes can facilitate the movement of lithium ions between the anode and cathode. Lithium-sulfur batteries are growing in popularity for defense, automotive, and aerospace applications due to their high energy density and ability to undergo successive charge and discharge cycles.

SUMMARY

Provided are composite cathode-separator laminations (CSL) including a current collector with sulfur-based host material applied thereto, a coated separator including an electrolyte membrane separator with a carbonaceous coating, and a porous, polymer-based interfacial layer forming a binding interface between the carbonaceous coating and the host material. The sulfur-based host material can include less than about 6% polymeric binder, and less than about 40% electrically conductive carbon, with the balance including one or more sulfur compounds. The CSL of claim 1, wherein the polymer-based interfacial layer can be a polymeric molecular layer deposition (MLD) coating layer. The polymer-based interfacial layer can be an organic-metal hybrid molecular layer deposition (MLD) coating layer. The polymer-based interfacial layer can be a polymerized gel-forming precursor, wherein the gel forming precursor can be a branched acrylate. The gel forming precursor can be polymerized by a UV initiator in the presence of UV light. The gel forming precursor can be polymerized by an electron-beam initiator in the presence of an electron-beam. The gel forming precursor can be polymerized by thermal initiator in the presence of heat. The polymer-based interfacial layer can have a thickness of less than about 5 μm. The host material can include less than about 40% conductive carbon. The host material can include less than about 25% conductive carbon. The host material can have a porosity of less than about 40%. The electrically conductive carbon of the host material can be only graphene. The carbonaceous coating can be only graphene. The carbonaceous coating can have a thickness of about 1 μm to about 5 μm.

Provided are lithium-sulfur battery cells, including an electrolyte, an anode disposed within the electrolyte, and a composite cathode-separator lamination (CSL) disposed within the electrolyte. The CSL can include a current collector with sulfur-based host material applied thereto, a coated separator including an electrolyte membrane separator with a carbonaceous coating including graphene, and a porous, polymer-based interfacial layer forming a binding interface between the carbonaceous coating and the host material. The sulfur-based host material can include less than about 6% polymeric binder, less than about 40% electrically conductive carbon, and the balance can include one or more sulfur compounds. The polymer-based interfacial layer can be a polymeric molecular layer deposition (MLD) coating layer. The polymer-based interfacial layer can be an organic-metal hybrid molecular layer deposition (MLD) coating layer. The polymer-based interfacial layer can be a polymerized gel-forming precursor, wherein the gel forming precursor includes a branched acrylate which can be polymerized by a UV initiator in the presence of UV light, polymerized by an electron-beam initiator in the presence of an electron-beam, or polymerized by thermal initiator in the presence of heat. The polymer-based interfacial layer can have a thickness of less than about 5 μm. The polymer-based interfacial layer can have porosity of about 5% to about 40%

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Provided herein are sulfur-based composite cathode-separator laminations (CSL) and battery cells comprising the same. The CSLs provided herein enable higher capacity battery cells with reduced manufacturing costs.

Figure 1:
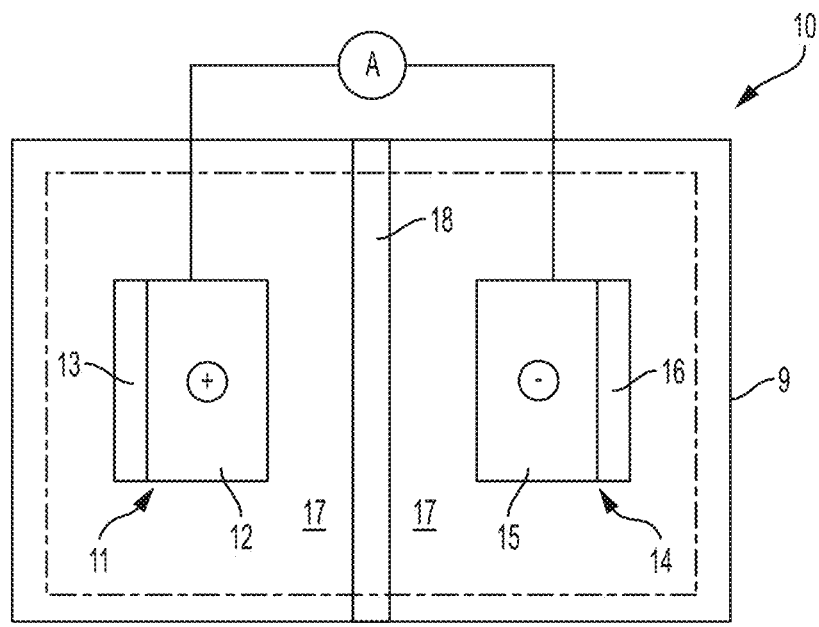
FIG. 1 illustrates a lithium-sulfur battery cell, according to one or more embodiments.

FIG. 1 illustrates a lithium-sulfur battery cell 10 comprising a positive electrode (i.e., the cathode) 11, a negative electrode (i.e., the anode) 14, an electrolyte 17 operatively disposed between the cathode 11 and the anode 14, and an electrolyte membrane separator ("separator") 18. Cathode 11, anode 14, and electrolyte 17 can be encapsulated in container 9, which can be a hard (e.g., metallic) case or soft (e.g., polymer) pouch, for example. The cathode 11 and anode 14 are situated on opposite sides of separator 18 which can comprise a microporous polymer or other suitable material capable of conducting lithium ions and optionally electrolyte (i.e., liquid electrolyte). Electrolyte 17 is a liquid electrolyte comprising one or more lithium salts dissolved in a non-aqueous solvent. Anode 14 generally includes a current collector 15 and a lithium active material 16 (e.g., a lithium alloy, metallic lithium, etc.) applied thereto. Cathode 11 generally includes a current collector 12 and a sulfur-based host material 13 applied thereto.

Active material 16 can store lithium ions at a lower electric potential than host material 13, for example. The current collectors 12 and 15 associated with the two electrodes are connected by an interruptible external circuit that allows an electric current to pass between the electrodes to electrically balance the related migration of lithium ions. Although FIG. 1 illustrates host material 13 and active material 16 schematically for the sake of clarity, host material 13 and active material 16 can comprise an exclusive interface between the cathode 11 and anode 14, respectively, and electrolyte 17.

Figure 2:
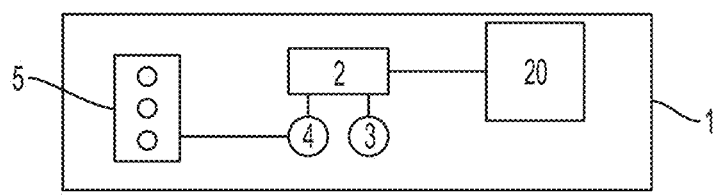
FIG. 2 illustrates a schematic diagram of a hybrid-electric vehicle, according to one or more embodiments.

Battery cell 10 can be used in any number of applications. For example, FIG. 2 illustrates a schematic diagram of a hybrid-electric vehicle 1 including a battery pack 20 and related components. A battery pack such as the battery pack 20 can include a plurality of battery cells 10. A plurality of battery cells 10 can be connected in parallel to form a group, and a plurality of groups can be connected in series, for example. One of skill in the art will understand that any number of battery cell connection configurations are practicable utilizing the battery cell architectures herein disclosed, and will further recognize that vehicular applications are not limited to the vehicle architecture as described. Battery pack 20 can provide energy to a traction inverter 2 which converts the direct current (DC) battery voltage to a three-phase alternating current (AC) signal which is used by a drive motor 3 to propel the vehicle 1. An engine 5 can be used to drive a generator 4, which in turn can provide energy to recharge the battery pack 20 via the inverter 2. External (e.g., grid) power can also be used to recharge the battery pack 20 via additional circuitry (not shown). Engine 5 can comprise a gasoline or diesel engine, for example.

Battery cell 10 generally operates by reversibly passing lithium ions between cathode 11 and anode 14. Lithium ions move from anode 14 to cathode 11 while discharging, and move from cathode 11 to anode 14 while charging. At the beginning of a discharge, anode 14 contains a high concentration of intercalated/alloyed lithium ions while cathode 11 is relatively depleted, and establishing a closed external circuit between cathode 11 and anode 14 under such circumstances causes intercalated/alloyed lithium ions to be extracted from anode 14. The extracted lithium atoms are split into lithium ions and electrons as they leave an intercalation/alloying host at an electrode-electrolyte interface. The lithium ions are carried through the micropores of separator 18 from anode 14 to cathode 11 by the ionically conductive electrolyte 17 while, at the same time, the electrons are transmitted through the external circuit from cathode 11 to anode 14 to balance the overall electrochemical cell. This flow of electrons through the external circuit can be harnessed and fed to a load device until the level of intercalated/alloyed lithium in the negative electrode falls below a workable level or the need for power ceases.

Battery cell 10 may be recharged after a partial or full discharge of its available capacity. To charge or re-power the lithium-sulfur battery cell, an external power source (not shown) is connected to the positive and the negative electrodes to drive the reverse of battery discharge electrochemical reactions. That is, during charging, the external power source extracts the lithium ions present in cathode 11 to produce lithium ions and electrons. The lithium ions are carried back through the separator by the electrolyte solution, and the electrons are driven back through the external circuit, both towards anode 14. The lithium ions and electrons are ultimately reunited at the negative electrode, thus replenishing it with intercalated/alloyed/metallic lithium for future battery cell discharge.

Lithium-sulfur battery cell 10, or a battery module or pack comprising a plurality of battery cells 10 connected in series and/or in parallel, can be utilized to reversibly supply power and energy to an associated load device. Lithium-sulfur batteries may also be used in various consumer electronic devices (e.g., laptop computers, cameras, and cellular/smart phones), military electronics (e.g., radios, mine detectors, and thermal weapons), aircrafts, and satellites, among others. Lithium-sulfur batteries, modules, and packs may be incorporated in a vehicle such as a hybrid electric vehicle (HEV), a battery electric vehicle (BEV), a plug-in HEV, or an extended-range electric vehicle (EREV) to generate enough power and energy to operate one or more systems of the vehicle. For instance, the battery cells, modules, and packs may be used in combination with a gasoline or diesel internal combustion engine to propel the vehicle (such as in hybrid electric vehicles), or may be used alone to propel the vehicle (such as in battery powered vehicles).

Returning to FIG. 1, electrolyte 17 conducts lithium ions between cathode 11 and anode 14, for example during charging or discharging the battery cell 10. The electrolyte 17 comprises one or more solvents, and one or more lithium salts dissolved in the one or more solvents. Suitable solvents can include cyclic carbonates (ethylene carbonate, propylene carbonate, butylene carbonate), acyclic carbonates (dimethyl carbonate, diethyl carbonate, ethylmethylcarbonate), aliphatic carboxylic esters (methyl formate, methyl acetate, methyl propionate), γ-lactones (γ-butyrolactone, γ-valerolactone), chain structure ethers (1,3-dimethoxypropane, 1,2-dimethoxyethane (DME), 1-2-diethoxyethane, ethoxymethoxyethane), cyclic ethers (tetrahydrofuran, 2-methyltetrahydrofuran, 1,3-dioxolane), and combinations thereof. A non-limiting list of lithium salts that can be dissolved in the organic solvent(s) to form the non-aqueous liquid electrolyte solution include $LiClO_4$, $LiAlCl_4$, LiI, LiBr, LiSCN, $LiBF_4$, $LiB(C_6H_5)_4$ $LiAsF_6$, $LiCF_3SO_3$, $LiN(CF_3SO_2)_2$, $LiN(FSO_2)_2$, $LiPF_6$, $LiNO_3$, and mixtures thereof.

The anode current collector 15 can include copper, nickel, stainless steel, or any other appropriate electrically conductive material known to skilled artisans. Anode current collector 15 can be treated (e.g., coated) with highly electrically conductive materials, including one or more of conductive carbon black, graphite, carbon nanotubes, carbon nanofiber, graphene, and vapor growth carbon fiber (VGCF), among others. The active material 16 applied to the anode current collector 15 can include any lithium active material that can sufficiently undergo lithium ion intercalation/deintercalation or alloying/de-alloying, while functioning as the negative terminal of the lithium-sulfur battery 10. Active material 16 can optionally further include a polymer binder material to structurally hold the lithium host material together. For example, in one embodiment, active material 16 can further include a carbonaceous material (e.g., graphite) and/or one or more of binders (e.g., polyvinyldiene fluoride (PVdF), an ethylene propylene diene monomer (EPDM) rubber, carboxymethoxyl cellulose (CMC), and styrene, 1,3-butadiene polymer (SBR)). Examples of suitable active materials 16 are known in the art.

Figure 3:
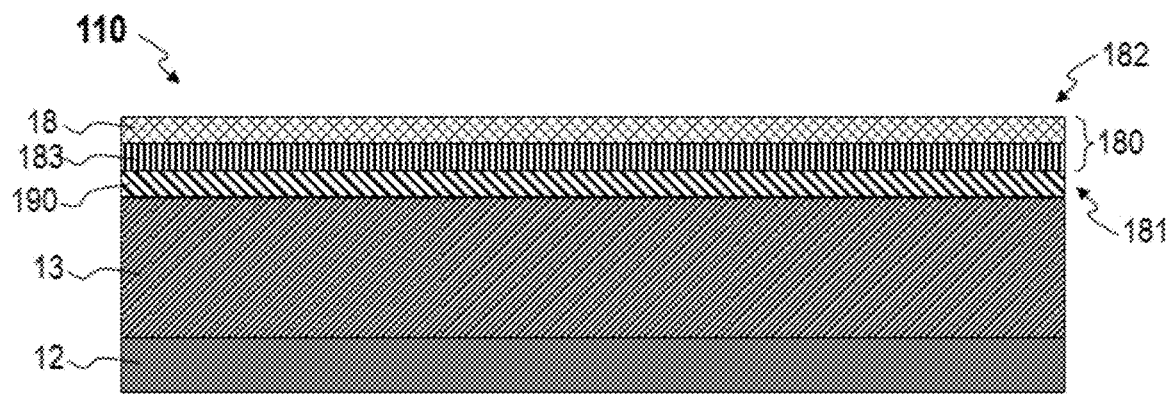
FIG. 3 illustrates a cross-sectional view of a cathode-separator lamination, according to one or more embodiments.
Figure 4:
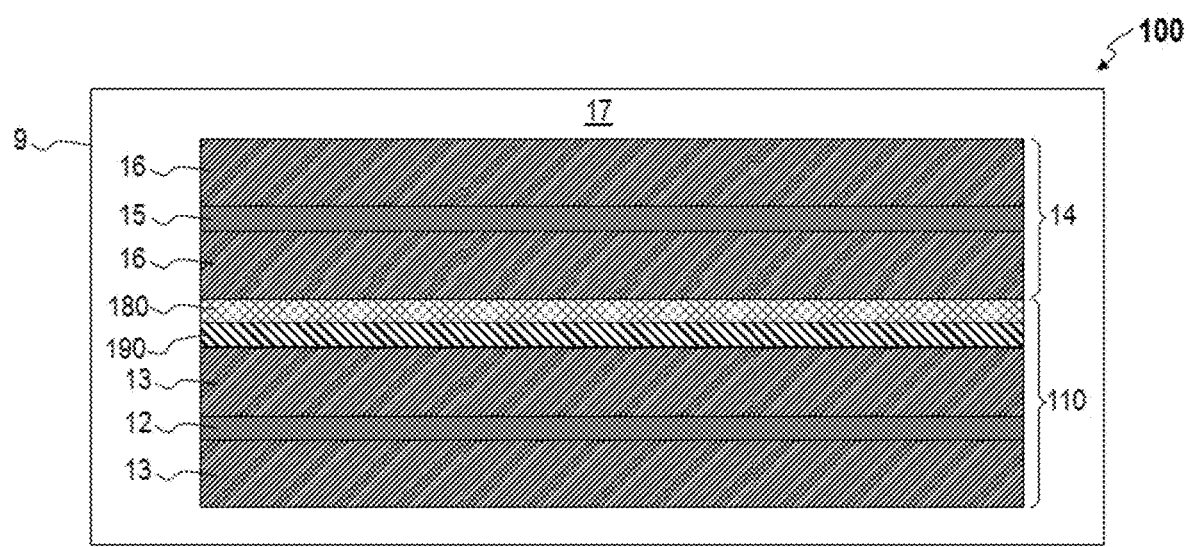
FIG. 4 illustrates a cross-sectional view of a battery cell including a cathode-separator lamination, according to one or more embodiments.

FIG. 3 illustrates a cross-sectional view of a composite cathode-separator lamination (CSL) 110 configured to generally perform the functions of a typical cathode 11 and separator 18. For example, CSL 110 and anode 14 can be disposed within an electrolyte 17 to form a battery cell 100 as shown in FIG. 4. CSL 110 comprises current collector 12 with host material 13 applied thereto, a coated separator 180 comprising a separator 18 with a carbonaceous coating 183, and an interfacial layer 190 forming an interface between the carbonaceous coating 183 and the host material 13. The coated separator 180 is shown as coated with carbonaceous coating 183 only on a cathode side 181, but carbonaceous coating 183 may optionally also be coated on an anode side 182 of the separator 18.

Host material 13 comprises a sulfur-based host material, typically in the form of a porous sulfur-carbon matrix composite, and generally includes electrically conductive carbon, a binder, such as a polymer binder material, to structurally hold the host material 13 together, and the balance comprising one or more sulfur compounds. Because the polymeric binders do not contribute to the energy density of electrical conductivity of the CSL 110, the host material 13 comprises less than about 10% binder, or less than about 6% binder. In some embodiments the host material 13 comprises about 1% binder to about 6% binder. The host material 13 can comprise up to about 40% electrically conductive carbon, but ideally up to about 25% electrically conductive carbon. In some embodiments, host material 13 can comprise about 45% to about 80% sulfur compounds, about 9% to about 45% electrically conductive carbon, and about 2% to about 10% binders. The host material 13 can have a porosity of up to about 70%, but will ideally have a porosity of less than about 45% or less than about 40%, for example.

Sulfur compounds suitable for use as host material 13 can comprise elemental sulfur, $Li_2S_8$, $Li_2S_6$, $Li_2S_4$, $Li_2S_2$, $Li_2S$, and combinations thereof. The electrically conductive carbon can comprise conductive carbon black, high surface area carbon, such as acetylene black or activated carbon, graphite, carbon nanotubes, carbon nanofiber, graphene, vapor growth carbon fiber (VGCF), and combinations thereof, among others. In some embodiments, the electrically conductive carbon within the host material consists of graphene. Suitable binders include polyvinylidene fluoride (PVDF), polyethylene oxide (PEO), an ethylene propylene diene monomer (EPDM) rubber, carboxymethyl cellulose (CMC)), styrene-butadiene rubber (SBR), styrene-butadiene rubber carboxymethyl cellulose (SBR-CMC), polyacrylic acid (PAA), cross-linked polyacrylic acid-polyethylenimine, polyimide, polyvinyl alcohol (PVA), sodium alginate, other water-soluble binders, or any other suitable binder material known to skilled artisans.

The cathode current collector 12 can include aluminum, nickel, stainless steel, or any other appropriate electrically conductive material known to skilled artisans and can be formed in a foil or grid shape, for example. The host material 13 can be applied to the current collector 12 by various methods. In one example, the host material 13 can be applied via a dry process (e.g., extrusion), wherein the one or more sulfur compounds, the electrically conductive carbon, and the polymer binders are combined (e.g., in powder form), heated, applied to the current collector 12, and subsequently solidified and/or cooled. When the host material 13 is applied to the current collector 12 via such a dry process, the host material can comprise less than about 3% binder, or about 1-3% binder. In another example, the host material 13 can be applied via a wet process, wherein one or more sulfur compounds, electrically conductive carbon, and binders are dissolved in a solvent to form a slurry. The slurry is subsequently applied to the current collector 12 and dried to evaporate the solvent. When the host material 13 is applied to the current collector 12 via such a wet process, the host material can comprise less than about 6% binder, or about 5-6% binder. The evaporation of solvent during the wet process forms a more porous host material 13 relative to the dry process, and accordingly a host material 13 formed via such a wet process may be subsequently pressed to reduce the porosity of the host material 13 to a desirable level (e.g., less than about 40%).

The microporous polymer separator 18 of the coated separator 180 can comprise polyolefin homopolymer(s) and/or heteropolymer(s), such as polyethylene (PE), polypropylene (PP), or a blend of PE and PP, and/or other polymers including polyethylene terephthalate (PET), polyvinylidene fluoride (PVdF), polytetrafluoroethylene (PTFE), and polyvinyl chloride (PVC). The polymers separator 18 can comprise a film, in some embodiments. Additionally or alternatively the separator can comprise nonwoven fibers (e.g., cotton, nylon, polyesters, glass). The separator 18 can have a porosity of about 20% to about 70%, about 30% to about 50%, or about 40%.

The carbonaceous coating 183 is applied at least to the cathode side 181 of the separator 18 to a thickness up less than about 10 μm, about 1 μm to about 7 μm, or about 1 μm to about 5 μm. The carbonaceous coating 183 can comprise conductive carbon black, high surface area carbon, such as acetylene black or activated carbon, graphite, carbon nanotubes, carbon nanofiber, graphene, vapor growth carbon fiber (VGCF), and combinations thereof, among others. In some embodiments, the carbonaceous coating 183 consists of graphene. The carbonaceous coating 183 can be applied to the separator using a roll-to-roll printing system (e.g., a CX400 system) wherein the carbonaceous material is provided dispersed in a solution and printed onto the separator 18. The solution can subsequently be dried/cured (e.g., via a UV curing process).

Interfacial layer 190 forms a binding interface between the carbonaceous coating 183 and the host material 13 and completes the composite structure of CSL 110 by sandwiching the sulfur-based host material 13 between the carbonaceous coating 183 and the current collector. Accordingly, the electrical conductivity of the host material 13, and thereby the utilization thereof (e.g., >1,000 mAh/g-sulfur), is increased. The high surface area of the carbonaceous coating 183 also traps dissolved polysulfides during cycling, thereby avoiding anode 14 deterioration and cathode host material 13 loss. Further, the carbonaceous coating 183 can absorb and store electrolyte on the cathode side 181 and prevent or reduce electrolyte 17 viscosity increases caused by the release of polysulfides.

Interfacial layer 190 is a generally thin (e.g., at most 5 μm) and porous (e.g., about 5% to about 40%) polymer-based layer. In some embodiments the interfacial layer 190 can have a thickness of about 10 nm to about 200 nm. The porosity of the interfacial layer 190 can depend on the thickness of the same layer, and the porosity of the substrate onto which it is applied (e.g., the host material 13 or the carbonaceous coating 183). In one embodiment, the interfacial layer 190 can be a molecular layer deposition (MLD) coating layer. In some embodiments, the MLD coating layer can comprise a polymeric layer including one or more polyamides, polyimides, polyureas, polyurethanes, polyesters (e.g., polyethylene terephthalate (PET)), and combinations thereof. In other embodiments, the MLD coating layer can comprise an organic-metal hybrid layer including alucone, zircone, titanicone, or other metal organic framework (MOF). MOFs generally comprise metal ions coordinated with organic ligands to form a cluster of prescribed crystallinity and porosity. For example, MOFs can include zirconium-based MOFs (e.g., UiO-66) or copper-based MOFs (e.g., copper(II)terephthalate (Cu-TPA)).

In other embodiments, the interfacial layer 190 can be a gel-electrolyte membrane layer formed from a matrix precursor including a gel-forming precursor and a gel-forming initiator. The gel-forming precursor is configured to form the polymer of the polymer matrix. In one embodiment, the gel-forming precursor is a branched acrylate having a functional moiety selected from the group consisting of a carboxylic acid and an ester. The gel-forming initiator is configured to initiate polymerization of the gel-forming precursor in response to reaching predetermined physical conditions.

In some embodiments, the gel-forming initiator is a UV initiator that initiates polymerization of the gel-forming precursor in response to being exposed to UV light. For example, the UV initiator can comprise a phenone compound. In some embodiments, the UV initiator is selected from the group consisting of 1,1-diphenylmethanone ("benzophenone"), 4,4'-dihydroxybenzophenone, acetophenone, anisoin, benzil, benzoin, 2-benzyl-2-(dimethylamino)-4'-morpholinobutyrophenone, camphorquinone, 4'-ethoxyacetophenone, methybenzoylformate, 2-methyl-4'-(methylthio)-2-morpholinopropiophenone, thioxanthen-9-one, combinations thereof, and the like.

In some embodiments, the gel-forming initiator is an electron-beam initiator that initiates polymerization of the gel-forming precursor in response to being exposed to an electron beam. For example, the electron-beam initiator can comprise diaryliodonium salts and/or triarylsulfonium salts. Diaryliodonium salts and triarylsulfonium salts include counter ions of hexafluoroarsenate, hexafluoroantimonate, hexafluorophosphate, tetrafluoroborate, combinations thereof, and the like. In some embodiments, the electron-beam initiator may be selected from the group consisting of diaryliodonium salts and triarylsulfonium salts.

In some embodiments, the gel-forming initiator is a thermal initiator that initiates polymerization of the gel-forming precursor in response to being exposed to elevated temperatures. For example, the thermal initiator can comprise azobisisobutyronitrile, 1,1'-azobis(cyclohexanecarbonitrile), benzoyl peroxide, di-tert-butyl peroxide, combinations thereof, and the like. In some embodiments, the thermal initiator can be selected from the group consisting of azobisisobutyronitrile, 1,1'-azobis(cyclohexanecarbonitrile), benzoyl peroxide, di-tert-butyl peroxide, combinations thereof, and the like.

The interfacial layer 190 can be applied to the carbonaceous coating 183 or the host material 13. The coated separator 180 and the cathode (i.e., the current collector 12 with host material 13 applied thereto) can be laminated together to form the CSL 110. The CSL 110 can be formed in a roll, which can be subsequently used to form a plurality of battery cells (e.g., pouch cells). In such a way, the composite nature of CSL 110 eliminates manufacturing steps and avoids battery cell failure caused by misalignment of battery cell components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A composite cathode-separator lamination (CSL) comprising:
   a current collector with sulfur-based host material applied thereto, wherein the sulfur-based host material comprises less than about 6% polymeric binder, and less than about 40% electrically conductive carbon, with the balance comprising one or more sulfur compounds;
   a coated separator comprising an electrolyte membrane separator with a carbonaceous coating; and
   a porous, polymer-based interfacial layer forming a binding interface between the carbonaceous coating and the host material.

2. The CSL of claim 1, wherein the polymer-based interfacial layer comprises a polymeric molecular layer deposition (MLD) coating layer.

3. The CSL of claim 1, wherein the polymer-based interfacial layer comprises an organic-metal hybrid molecular layer deposition (MLD) coating layer.

4. The CSL of claim 1, wherein the polymer-based interfacial layer is a polymerized gel-forming precursor, wherein the gel forming precursor comprises a branched acrylate.

5. The CSL of claim 4, wherein the gel forming precursor is polymerized by a UV initiator in the presence of UV light.

6. The CSL of claim 4, wherein the gel forming precursor is polymerized by an electron-beam initiator in the presence of an electron-beam.

7. The CSL of claim 4, wherein the gel forming precursor is polymerized by thermal initiator in the presence of heat.

8. The CSL of claim 1, wherein the polymer-based interfacial layer comprises a thickness of less than about 5 µm.

9. The CSL of claim 1, wherein the host material comprises less than about 40% conductive carbon.

10. The CSL of claim 1, wherein the host material comprises less than about 25% conductive carbon.

11. The CSL of claim 1, wherein the host material has a porosity of less than about 40%.

12. The CSL of claim 1, wherein the electrically conductive carbon of the host material consists of graphene.

13. The CSL of claim 1, wherein the carbonaceous coating consists of graphene.

14. The CSL of claim 13, wherein the carbonaceous coating comprises a thickness of about 1 µm to about 5 µm.

15. A lithium-sulfur battery cell comprising:
   an electrolyte;
   an anode disposed within the electrolyte; and
   a composite cathode-separator lamination (CSL) disposed within the electrolyte and comprising:
      a current collector with sulfur-based host material applied thereto, wherein the sulfur-based host material comprises less than about 6% polymeric binder, and less than about 40% electrically conductive carbon, with the balance comprising one or more sulfur compounds;

a coated separator comprising an electrolyte membrane separator with a carbonaceous coating comprising graphene; and a porous, polymer-based interfacial layer forming a binding interface between the carbonaceous coating and the host material.

16. The lithium-sulfur battery cell of claim 15, wherein the polymer-based interfacial layer comprises a polymeric molecular layer deposition (MLD) coating layer.

17. The lithium-sulfur battery cell of claim 15, wherein the polymer-based interfacial layer comprises an organic-metal hybrid molecular layer deposition (MLD) coating layer.

18. The lithium-sulfur battery cell of claim 15, wherein the polymer-based interfacial layer is a polymerized gel-forming precursor, wherein the gel forming precursor comprises a branched acrylate and is polymerized by a UV initiator in the presence of UV light, polymerized by an electron-beam initiator in the presence of an electron-beam, or polymerized by thermal initiator in the presence of heat.

19. The lithium-sulfur battery cell of claim 15, wherein the polymer-based interfacial layer comprises a thickness of less than about 5 µm.

20. The lithium-sulfur battery cell of claim 15, wherein the polymer-based interfacial layer comprises porosity of about 5% to about 40%.

* * * * *